F. R. KUNKEL.
FIELD MAGNET WINDING FOR DYNAMO ELECTRIC MACHINES.
APPLICATION FILED SEPT. 8, 1908.

926,262.

Patented June 29, 1909.

WITNESSES:
INVENTOR
Fred R. Kunkel
BY
ATTORNEY

UNITED STATES PATENT OFFICE.

FRED R. KUNKEL, OF EDGEWOOD PARK, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

FIELD-MAGNET WINDING FOR DYNAMO-ELECTRIC MACHINES.

No. 926,262.  Specification of Letters Patent.  Patented June 29, 1909.

Application filed September 8, 1908. Serial No. 452,084.

*To all whom it may concern:*

Be it known that I, FRED R. KUNKEL, a citizen of the United States, and a resident of Edgewood Park, in the county of Allegheny and State of Pennsylvania, have invented a new and useful Improvement in Field-Magnet Windings for Dynamo-Electric Machines, of which the following is a specification.

My invention relates to dynamo-electric machines and particularly to field magnet structures and windings thereof.

The object of my invention is to provide a field magnet winding for a dynamo-electric machine having its polar projections integral with the yoke and provided with enlarged integral extremities or shoes adjacent to the armature, the winding being such that it may be wound separate from the machine in coil form and afterward readily and compactly applied to the polar projections.

Figure 1:
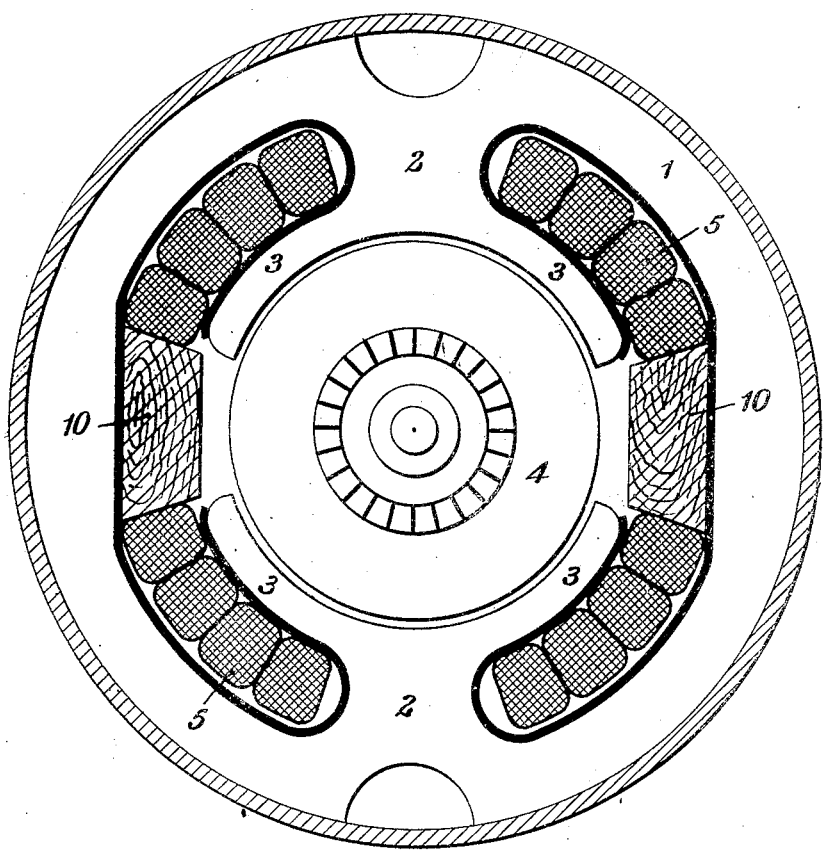
Figure 2:
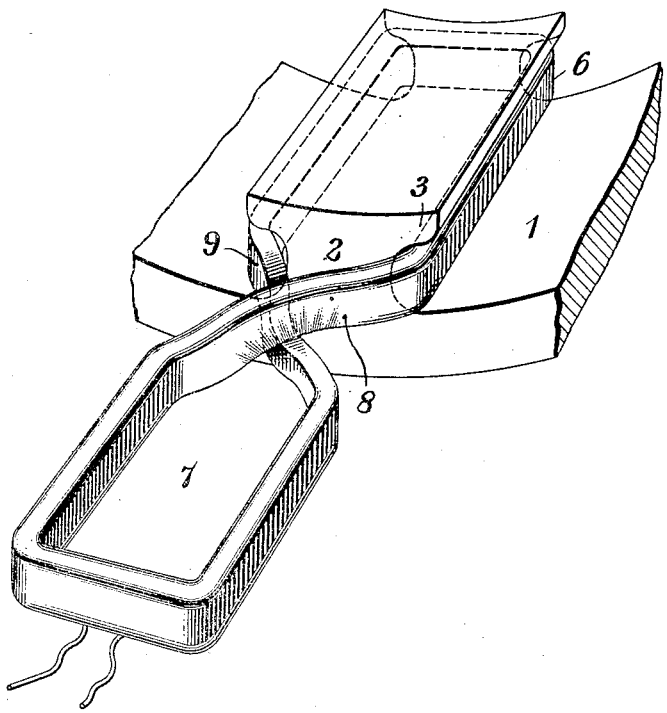
Figure 3:
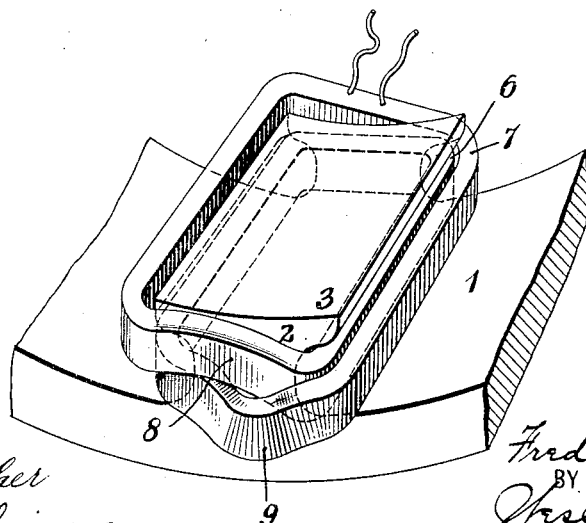

Figure 1 of the accompanying drawing is a transverse sectional view through a machine constructed in accordance with the present invention, and Figs. 2 and 3 are perspective views illustrating, in a simple case, the manner in which the present winding is applied to a polar projection.

The field magnet structure in connection with which the present invention is employed is composed of laminated sheet steel punchings 1 having integral inwardly extending polar projections 2 terminating in integral portions 3 of ring-segment form that embrace almost the entire circumference of the armature, and the widths of which are much greater than the widths of the body portions of the projections.

Each polar projection is provided with a winding 5 consisting of a coil that is formed into a plurality of loops surrounding the small body portion of the projection between its extremity and the yoke of the field magnet, at least the last loop being of sufficient internal length to permit it to be applied over the enlarged extremity 3 of the pole piece after the other loops are in position. The coils are wound before being applied to the machine and each consists of only a fraction of the number of convolutions of the completed windings.

As indicated in Fig. 2, each coil section may comprise two loops 6 and 7, opposite sides of which are connected by portions 8 and 9. In placing the coil section on the pole piece, the loop 6 is first applied by springing its sides apart sufficiently to enable them to slip over the end portion 3 of the pole piece and the portions 8 and 9 are then bent until the loop 7 is in position to be pressed into place around the loop 6, as indicated in Fig. 3.

After all the core sections are in position they may be held therein by means of wedge blocks 10 of insulating material, as indicated in Fig. 1.

It is apparent that the winding herein set forth permits of the employment of the field magnet punchings or structures having integral projections with enlarged polar faces and of coil or form-wound windings that may be readily applied thereto, thus obviating the necessity, which has heretofore existed, of manually winding the coils directly upon the polar projections.

I claim as my invention:

1. In a dynamo-electric machine, the combination with a field magnet structure comprising a polar projection having a small body portion and an enlarged end portion, of a winding therefor consisting of a coil formed of a plurality of loops surrounding the body portion of the pole, the final or outer loop being of sufficient internal peripheral length to permit the same to be applied over the end portion of the polar projection.

2. In a dynamo-electric machine, the combination with a field magnet structure comprising a polar projection having a small body portion and an enlarged end portion, of a winding therefor consisting of a coil formed of a plurality of loops surrounding the body portion of the pole, the final or outer loop being of greater internal peripheral length than the periphery of the enlarged end portion of the polar projection.

3. In a dynamo-electric machine, the combination with a field magnet structure comprising a polar projection having a small body portion and an enlarged end portion, of a winding therefor consisting of a coil formed of a plurality of loops one or more of which are of less internal peripheral length than the enlarged portion of the polar projection and at least one of which is of greater internal peripheral length than
5 the said enlarged portion of the polar projection.

In testimony whereof, I have hereunto subscribed my name this 3rd day of September, 1908.

FRED R. KUNKEL.

Witnesses:
BIRNEY HINES,
W. T. BRANSON.